United States Patent [19]
Martin et al.

[11] 3,870,510
[45] Mar. 11, 1975

[54] METHOD FOR THE INTRODUCTION OF SOLID PRODUCTS

[75] Inventors: Daniel Martin; Pierre Vayssiere, both of Metz, France

[73] Assignee: Institut de Recherches de la Siderurgie Francaise (IRSID), St.-Germain-en-Laye, France

[22] Filed: Mar. 26, 1973

[21] Appl. No.: 344,718

[30] Foreign Application Priority Data
Mar. 29, 1972  France .............................. 72.11119

[52] U.S. Cl. ..................... 75/61, 75/46, 214/18 SC, 214/152, 266/34 R
[51] Int. Cl. .............................................. C21c 5/56
[58] Field of Search ......... 75/43, 44 R, 44 S, 53–61, 75/46, 13; 266/1 R, 33, 34 R, 34 T, 34 A, 37; 214/18 R, 18 SC, 31, 152, 19

[56] References Cited
UNITED STATES PATENTS

| | | | |
|---|---|---|---|
| 3,116,841 | 1/1964 | Kocks .................................. | 214/31 |
| 3,275,432 | 9/1966 | Alexandrovsky ...................... | 75/60 |
| 3,307,935 | 3/1967 | Lindholm .................... | 214/18 SC X |
| 3,406,027 | 10/1968 | Bonilla et al ........................... | 75/53 |

*Primary Examiner*—C. Lovell
*Assistant Examiner*—M. J. Andrews

[57] ABSTRACT

A method for introducing solid products such as scrap into a continuous refining plant having a reaction container, a settling tank adjacent thereto, and a sill between the reaction container and the settling tank. The solid products are first introduced into the plant by way of an aperture in the wall of the settling tank. The solid products are then conveyed across the settling tank and the sill and into the reaction container, and are finally discharged in the reaction container.

5 Claims, 5 Drawing Figures

METHOD FOR THE INTRODUCTION OF SOLID PRODUCTS

The present invention relates to the introduction of solid products into a continuous refining plant for refining pig iron into steel.

Whatever refining techniques are used for producing steel from pig iron, the steel-maker has always sought to introduce solid charges rich in iron in the course of production, for various metallurgical and economic reasons. For example, it is desirable to re-use scrap obtained either from waste recovery, or from the scrap produced by the factory itself, so as to reduce the cost of production of the steel. Consequently, electric furnaces and Martin furnaces have always been large consumers of scrap.

This is also the case in which converters are employed, wherein one strives to introduce the maximum possible quantity of these iron-rich solid products into the steel.

The problem of introducing iron-rich solid products, and in particular scrap, also arises in processes for the continuous refining of pig iron into steel.

However, in this case, new difficulties are met, arising firstly from the need to ensure practically continuous feeding, and secondly from the structural features of these plants. In fact, even when such plants have a high hourly output, the input of metal remains quite small and the size of the equipment is relatively small as compared with those for an intermittently operating plant with the same output. Furthermore, these plants are usually equipped with means for collecting gas without combustion which, in order to limit the entry of air, necessitates control of the drawing in of gas and of the internal pressure in the plant relative to the external pressure.

For those reasons, the direct introduction of solid products into the reactor which immediately comes to mind, by analogy with converter practice, results in certain difficulties. The introduction in this case is performed in a turbulent medium in the course of permanent refining, and an aperture formed in the reactor wall near this boiling medium has every chance of receiving frequent spatterings of metal and of being obstructed sooner or later. Also, it is difficult to provide pressure control in such a turbulent medium.

The object of the present invention is to provide a solution to this problem and to permit the introduction of solid products into a continuous refining reactor without the necessity of providing a supplementary aperture for said products.

With this consideration, the invention therefore relates to a method of introducing solid products into a plant for the continuous refining of pig iron into steel, comprising a reactor and an adjoining settling tank, separated from the reactor by a sill, said method comprising the introduction of the solid products through an aperture formed in the wall of the settling tank, advancing the products through the pouring compartment and beyond the sill into the reactor, and discharging the products in the reactor. It will be noted that an aperture is used for introducing the changes which is no longer in the turbulent zone of the reactor, but in a very calm region corresponding to the settling zone. Hence, the risk of splashes need no longer be feared and the regulation of pressure is also greatly facilitated.

An embodiment of the invention will now be described, by way of example, with reference to the accompanying drawings, wherein.

Before commencing the description of this installation, it should be noted that it represents one practical application of the method, but that numerous other technical variations may alternatively be employed within the scope of the invention.

Figure 1:
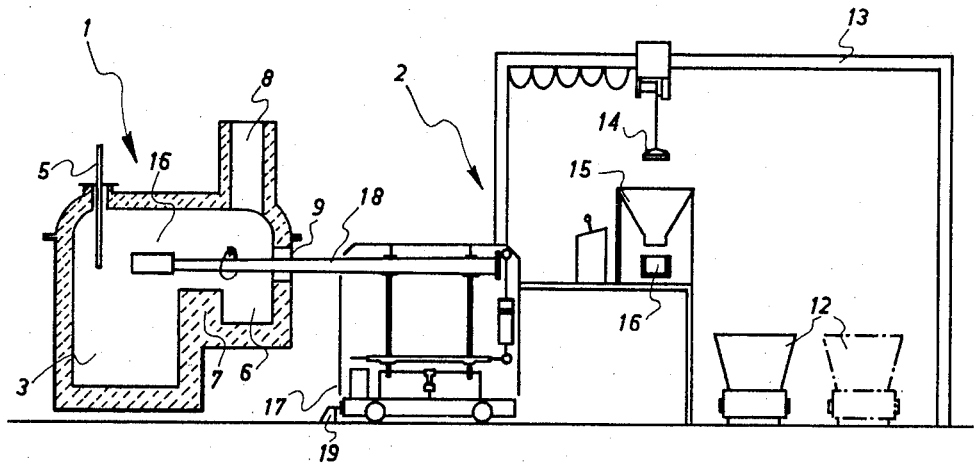
FIG. 1 is an elevational view, partly in section, of the lay-out of an installation containing a reactor supplied with solid products in accordance with the invention.
Figure 2:
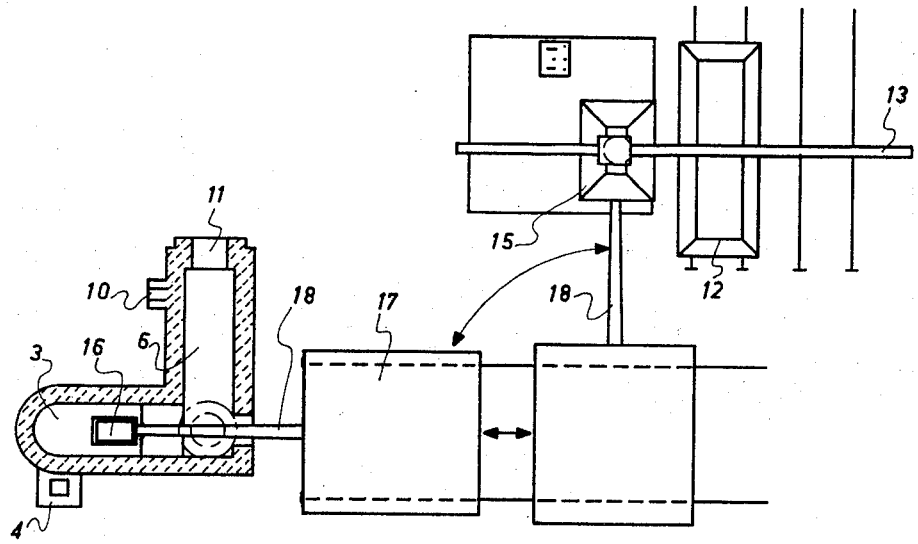
FIG. 2 is a plan view of the installation of FIG. 1.

In FIG. 1, a continuous refining installation is shown schematically at 1, with the assembly 2 required for introducing the solid products in the refining installation. In this the solid products are scrap. The continuous refining installation consists of a reactor 3, adapted to be fed with pig iron through a shaft 4 (FIG. 2) wherein the products of refining are blown by means of a lance 5. The products of the refining operation flow into a settling tank 6 adjoining the reactor 3 and separated therefrom by a sill 7. The settling tank 6 is provided with a conduit 8 for collecting the gases and a lateral aperture 9 for the introduction of the solid products. It will be noted from FIG. 2 that the settling tank 6 also has two other apertures, i.e., one aperture 10 for the removal of the metal and the other aperture 11 for the removal of the slag. It should be noted that these apertures are of the kind having a trap or the like to prevent the entry of air. The assembly 2 for the introduction of the scrap is positioned adjacent the refining installation. The scrap is transported from a storage point in trucks 12 of relatively large capacity to form a stock of scrap. An overhead crane 13 with an electro-magnet 14 lifts the scrap from the trucks and feeds it into a hopper 15 which ensures that a specific amount of metal is loaded into the troughs 16. Full troughs are carried from beneath the hopper 15 to the refining installation by a charger 17 provided with a feeder arm 18. This feeder is mobile and is provided with suitable means, such as wheels, so that it may be moved back and forth with respect to the refining installation. This movement is clearly shown in FIG. 2, which illustrates the method of introducing scrap into the refining installation.

After taking the loaded trough 16 from below hopper 15, the arm 18 is rotated about a vertical axis to move the trough to a position opposite the aperture 8 in the settling tank 6. The charger 17 then moves toward the refining installation so as to introduce the trough 16, i.e., the scrap, through the aperture 9, and the charger continues its movement to carry the charge across the settling tank and beyond the sill 7 into the reactor 3. When the trough has reached the selected point for the introduction of the scrap, the movement of the charger is stopped by locating abutments 19, for example in the path of movement of the charger, and the arm 18 is rotated to discharge the scrap contents of the trough into the refining installation. The charger then starts a return movement so that it can begin a new loading operation.

In the installation hereinbefore described, it will be noted that only one aperture 8, in a vertical plane, is in direct communication with the atmosphere. It is therefore at the level of this aperture that the pressure in the apparatus is controlled. It is clear that other arrangements for the introduction of scrap may be envisaged, especially that shown in FIG. 3a which avoids the piercing of a refractory wall. In this version, the collector hood 8 is off-center in relation to the settling tank 6, and the introduction of scrap takes place between the lower part of the hood 8 and the external vertical wall 20 of the settling tank. This system while technically simpler is less suitable from the standpoint of collecting gas without combustion, since one cannot prevent the entry of air at the aperture 9, which causes partial combustion and reduction in the CO output.

Figure 3B:
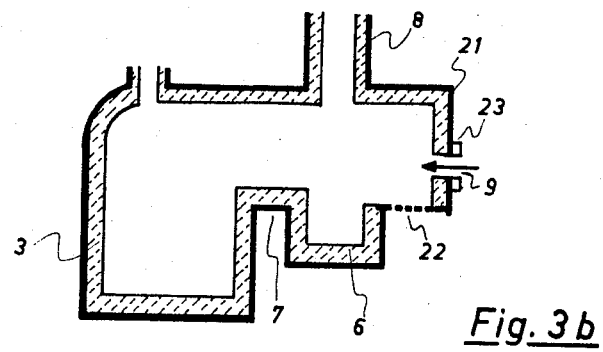
FIGS. 3a, 3b and 3c show various constructions for a continuous refining plant enabling scrap to be fed through the settling tank.
Figure 3C:
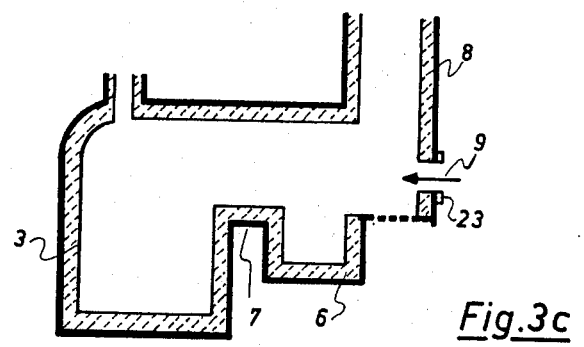
Figure 3A:
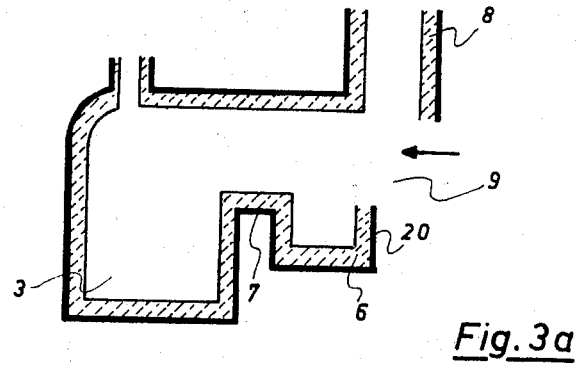

In general, experience has shown that it is easier to provide good regulation with an aperture in a horizontal plane than with a vertical aperture. Such an arrangement is also compatible with the introduction of scrap via the settling tank, as shown in FIGS. 3b and 3c. In the embodiment in 3b, the collector conduit 8 includes a projection 21 whose vertical wall forms the hood and in which is formed the feed aperture 9. As will be noted, this arrangement is also provided with a horizontal aperture 22 the level at which pressure regulation occurs. On the other hand, this means that there are two apertures connected to the atmosphere, and hence it is necessary to insulate the aperture 9 by means of a gas-constricting torus shown schematically at 23. Even in the case where the torus is fed with air, there is only a slight risk of nitrogen settling on the metal; this contrasts with the embodiment having the same device housed in the reactor, since the metal in the settling tank is protected by a layer of slag. FIG. 3c shows an embodiment very similar in principle, but in which the collector conduit 8 is off-center and also forms a hood.

It will readily be noted that these various practical embodiments are all intended to permit operation of the method proposed by the invention, i.e., the introduction of the ironrich solid products across the settling tank.

It is, moreover, evident that these various embodiments are given by way of example only, and that there are numerous other manners of practicing the method suited to the individual lay-out of any particular refining assembly.

What we claim is:

1. A method of introducing solid products into a plant for the continuous refining of pig iron steel, said plant being of the type comprising a reaction container and a settling tank separated from the reaction container by a sill; said method comprising introducing said solid products through an aperture formed in the wall of the settling tank, then conveying said solid products across said settling tank and said sill into said reaction container, and then discharging said products in said reaction container.

2. The method of claim 1 for use in a plant having a single aperture in a vertical plane in said settling tank, wherein said step of introducing comprises introducing said solid products to said wall.

3. The method of claim 1 for use in a plant having a collector hood offset with respect to said settling tank, wherein said step of introducing comprises introducing said solid products between the lower part of said hood and an external wall of said settling tank.

4. The method of claim 1 for use in a plant having a collector conduit with a vertical wall forming a hood, wherein said step of introducing comprises introducing said solid products through an aperture in said vertical wall.

5. The method of claim 4, in which the collector hood is offset from said settling tank, wherein said step of introducing said solid products comprises introducing said solid products through an aperture formed in an offset wall of said hood.

* * * * *